United States Patent [19]
Feldman et al.

[11] Patent Number: 5,695,549
[45] Date of Patent: Dec. 9, 1997

[54] SYSTEM FOR REMOVING FINE PARTICULATES FROM A GAS STREAM

[75] Inventors: Paul L. Feldman, Sykesville, Md.; Krishnaswamy S. Kumar, Milford, N.J.

[73] Assignee: Environmental Elements Corp., Baltimore, Md.

[21] Appl. No.: 628,406

[22] Filed: Apr. 5, 1996

[51] Int. Cl.$^6$ .................................................. B03C 3/14
[52] U.S. Cl. ................................... 96/55; 95/80; 96/97
[58] Field of Search ........................... 95/78, 80, 81; 96/63–66, 68–70, 97, 98, 100, 80, 96, 55; 361/226, 233

[56] References Cited

U.S. PATENT DOCUMENTS

| Re. 34,549 | 2/1994 | Sun | 96/66 |
|---|---|---|---|
| 977,335 | 11/1910 | Shaffner | 96/63 |
| 1,381,660 | 6/1921 | Rathbun | 95/57 |
| 1,427,370 | 8/1922 | Fortescue | 96/62 |
| 1,790,961 | 2/1931 | Welch | 96/60 |
| 2,556,982 | 6/1951 | Roos et al. | 96/66 |
| 2,844,214 | 7/1958 | Hall et al. | 96/66 |
| 3,073,094 | 1/1963 | Landgraf et al. | 96/66 |
| 3,555,818 | 1/1971 | Vlier | 96/64 |
| 3,562,127 | 2/1971 | Wooten et al. | 204/164 |
| 3,616,606 | 11/1971 | Vincent | 96/66 |
| 3,668,836 | 6/1972 | Richardson et al. | 96/66 |
| 3,973,932 | 8/1976 | Alskog | 55/481 |
| 4,189,308 | 2/1980 | Feldman | 95/75 |
| 4,205,969 | 6/1980 | Matsumoto | 96/66 |
| 4,209,306 | 6/1980 | Feldman et al. | 95/80 |
| 4,279,625 | 7/1981 | Inculet et al. | 96/66 |
| 4,354,858 | 10/1982 | Kumar et al. | 96/66 X |
| 4,406,762 | 9/1983 | Ray et al. | 204/157.44 |
| 5,009,683 | 4/1991 | Sun | 96/66 |

FOREIGN PATENT DOCUMENTS

| 1078096 | 3/1960 | Germany | 96/66 |
|---|---|---|---|

*Primary Examiner*—Richard L. Chiesa
*Attorney, Agent, or Firm*—Morton J. Rosenberg; David I. Klein; Jun Y. Lee

[57] ABSTRACT

A system incorporating an agglomerator is provided for removing fine particulates from a gas stream. The agglomerator (100) is coupled to a flue (12) for agglomerating fines (30) entrained in a gas stream, the agglomerates (40) reentrained into the gas stream are carried by ductwork (14) to an existing particulate removal system (20). Agglomerator (100) includes at least two screen electrodes (102, 104) for charging the particulates (30) and temporarily collecting the charged particles on the collection electrode screen (104). The charging electrode (102) is provided with a plurality of spaced pointed electrode elements (108), the spacing therebetween being proportional to a spacing between the two screen electrodes (102, 104). The screen electrodes (102, 104) have a grid spacing sufficiently large to insure reentrainment of the agglomerates (40) back into the bulk gas stream for separation by the existing particulate removal system (20).

18 Claims, 2 Drawing Sheets

SYSTEM FOR REMOVING FINE PARTICULATES FROM A GAS STREAM

BACKGROUND OF THE INVENTION

Field of the Invention

This invention directs itself to particulate removal systems. In particular, this invention directs itself to a module to be incorporated into new or existing particulate removal systems for increasing their efficiency and ability to remove fine particulates. Still further, this invention directs itself to a system for causing fine particulates to agglomerate and combine with larger particles so that they may be more easily captured and removed by conventional devices, such as electrostatic precipitators, fabric filters and centrifugal particle separators. More in particular, this invention pertains to an agglomerator having at least a pair of screen electrodes coupled to opposing outputs of a power supply, for charging particulates as they pass through a first of the electrodes and temporarily capturing the charged particulates on the second electrode. Further, this invention directs itself to an agglomerator having a screen electrode to which a plurality of spaced pointed electrode elements extend longitudinally in a direction of the gas stream flow for forming a substantially uniform corona discharge to charge the particulates passing therethrough. Still further, this invention directs itself to an agglomerator wherein the spacing between respective pointed electrode elements is proportional to the spacing between the screen electrodes.

PRIOR ART

Electrostatic systems having screen electrodes are well known in the art. The best prior art known to the Applicants include U.S. Pat. Nos. 977,335; 1,381,660; 1,427,370; 1,790,961; 2,556,982; 2,844,214; 3,073,094; 3,555,818; 3,562,127; 3,616,606; 3,668,836; 3,973,932; and, 4,205,962.

In some prior art systems, such as that disclosed by U.S. Pat. No. 2,556,982, a plurality of spaced screen electrodes 24, 27, 30, 33, 36, 39, and 42 are disposed upstream of a glass wool filter 20. The screen electrodes are formed of a highly resistive material, each being coupled centrally to the positive high voltage electrode 15, and coupled to the ground reference potential at the perimeter thereof. The screen electrodes are further provided with a grid spacing which varies with the distance from the vertically directed positive high voltage electrode spike, such spacing varying in inverse proportion to the distance from the positive high voltage electrode. The multiple screen electrodes are not arranged in pairs with one electrode of the pair providing a charging of particulates by generation of corona discharge and the other forming a collection electrode to attract and only temporarily hold particulates.

In other prior art systems, such as that disclose in U.S. Pat. Nos. 977,335 and 3,616,606, electrostatic filtering systems are provided utilizing multiple screen electrodes arranged transversely with respect to a gas stream flow. In such systems alternate screens are oppositely poled by coupling to opposing ends of a power source. However, none of these systems incorporate a plurality of spaced pointed electrode elements for forming a substantially uniform corona discharge.

In still other systems, such as that disclosed in U.S. Pat. Nos. 1,381,660 and 3,668,836, screen electrodes, or perforated plates are utilized as collection electrodes in electrostatic precipitator systems. In each of these systems the grid spacing/aperture size and spacing is selected to maximize the collection of charged particulates from the gas stream. Such systems are not intended to reentrain agglomerates for subsequent removal and separation from the gas stream.

SUMMARY OF THE INVENTION

A system for removing fine particulates from a gas stream is provided. The system includes a longitudinally extended housing having a gas inlet disposed at one longitudinal end coupled to a gas source for flow of a particulate-laden gas stream therein. The housing further has a gas outlet disposed on an opposing longitudinal end thereof. The system has a first screen electrode disposed transversely within the housing, the first screen electrode having a predetermined grid spacing. Also included is a second screen electrode disposed transversely within the housing and longitudinally spaced from the first screen electrode for forming agglomerates thereon and reentraining the agglomerates into the gas stream flow. The second screen electrode also has a predetermined grid spacing. The system includes a power supply having a first voltage output line coupled to the first screen electrode and a second voltage output line coupled to the second screen electrode. A plurality of pointed electrode elements are included in the system, the pointed electrode elements being electrically coupled to the first screen electrode and extending longitudinally from the first screen toward the gas stream flow. The system further includes an agglomerate removal assembly coupled in fluid communication to the gas outlet of the housing.

DESCRIPTION OF THE PREFERRED EMBODIMENTS

Figure 1:
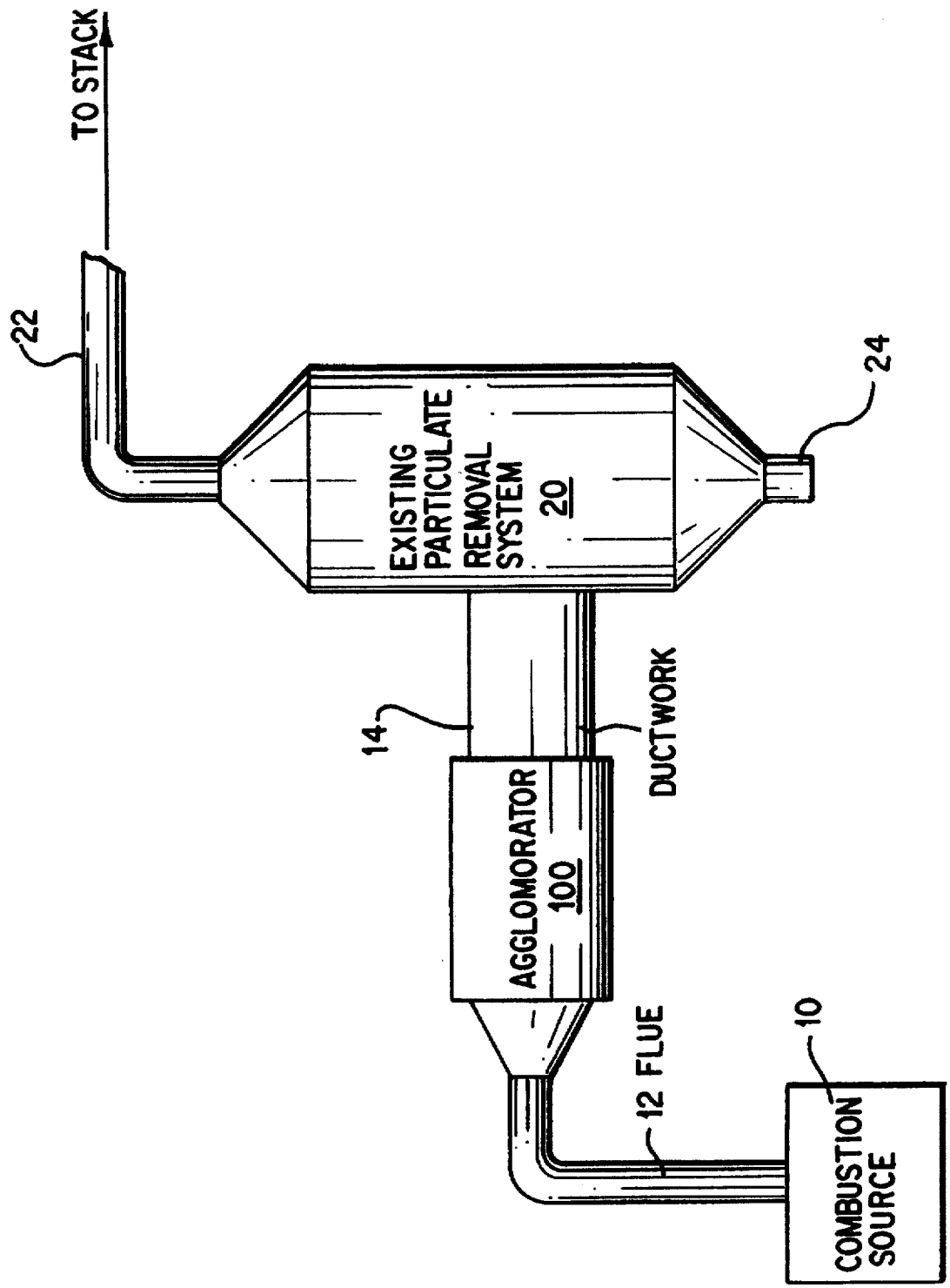
FIG. 1 is a block diagram of a system incorporating the present invention.
Figure 3:
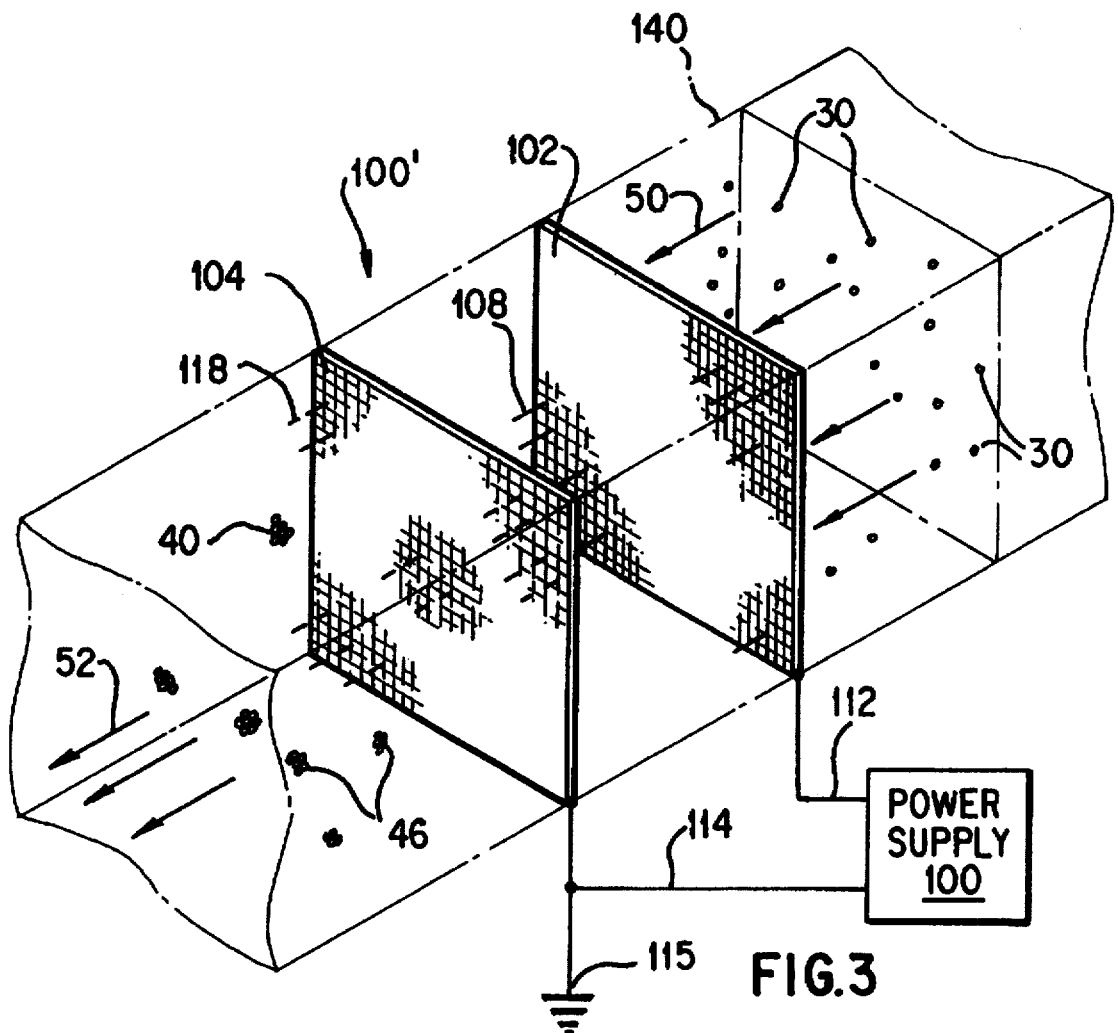
FIG. 3 is a perspective cut-away view of an alternate configuration of the present invention.
Figure 2:
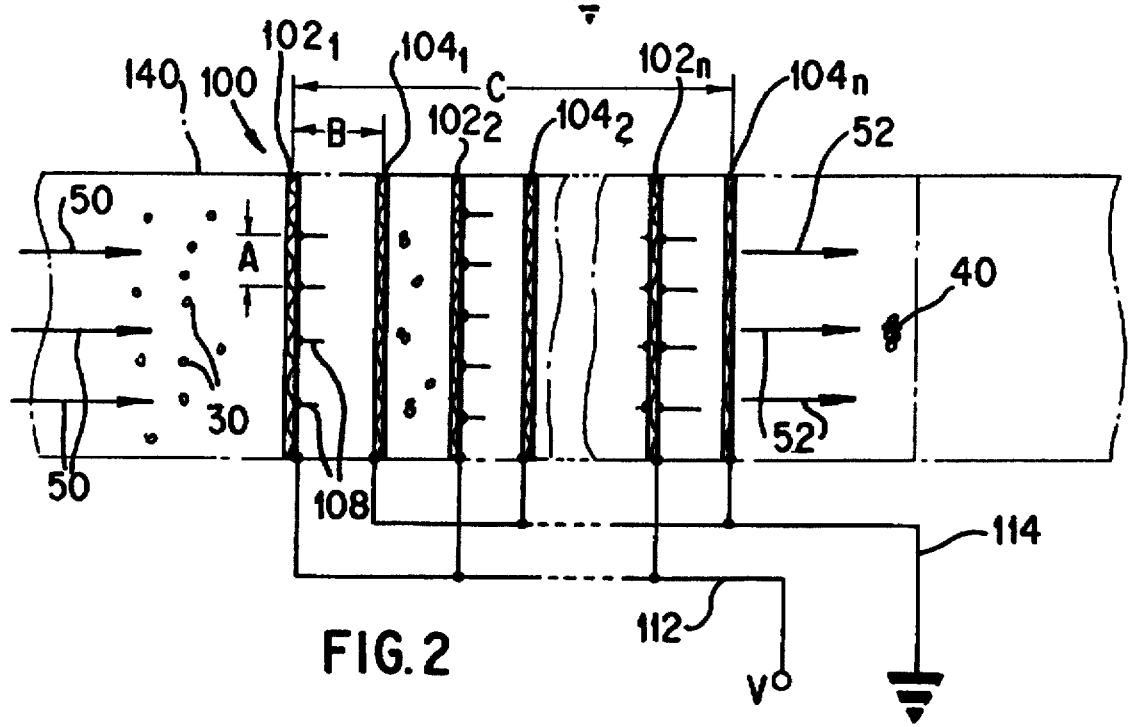
FIG. 2 is a schematic elevation view of the present invention.

Referring to FIGS. 1–3, there is shown agglomerator 100 for precharging and agglomerating particulates suspended in a gas stream. As will be seen in following paragraphs, agglomerator 100 is specifically directed to the concept of adding electrostatic charge to particulates, as well as temporarily attracting fine particles for contact with other particles on a collecting surface to form agglomerates and subsequently permitting such agglomerates to be reentrained back into the gas stream. Although not restricted to utilization with any particular type of combustion source 10, agglomerator 100 is particularly advantageous for use in coal-fired power plants wherein more stringent stack opacity requirements and hazardous air pollutant emission standards require modification to existing particulate removal systems. Addition of agglomerator 100 as a pre-treatment stage for an existing particulate removal system 20 can increase the particulate removal efficiency sufficiently to avoid costly enlargements in the size of particulate removal system 20, as well as providing an overall particulate removal system whose efficiency is greater than could ever be achieved by any increase in the specific collection area of the existing particulate removal system 20. Additionally, the introduction of agglomerator 100 upstream of an existing particulate removal system 20 provides the beneficial effect of lowering the pressure drop of the existing particulate removal system 20.

FIG. 1 shows the retrofit of agglomerator 100 into the ductwork 14 of an existing system. A combustion source 10 has an effluent which passes through the flue 12. Combustion source 10 may be a furnace or boiler fired by coal or oil, an incinerator, or other combustion device wherein particulates, toxic trace metals and their compounds, and heavy organics are emitted. Such hazardous air pollutants are suspended in the gas exhausted from the combustion source 10, and are carried by a flue 12 to a ductwork 14 for passage through an existing particulate removal system 20. Particulates removed by system 20 are collected and may be removed through a waste removal outlet 24, while the cleaned flue gas passes through a conduit 22 to a stack (not shown) for emission to the atmosphere.

The toxic trace metals and their compounds, as well as the heavy organics tend to concentrate on fine particulates, particulates in the range of 0.1–2.0 microns. The ability to efficiently and reliably remove such fine particles by utilization of agglomerator 100, to pre-treat the particulates suspended in the flue gas prior to their introduction into the existing particulate removal system, enhances the efficiency of system 20. Agglomerator 100 utilizes electrostatic principles to temporarily attract the fine particulates, causing the particulates to agglomerate and be reentrained into the gas stream as larger particles, particles large enough to be much more easily removed by system 20. Further, it is a well known phenomena that the pressure drop through a filter device may be reduced if the filtered particles are electrostatically precharged. Agglomerator 100 provides a precharging function, and thus provides the additional benefit to system 20 of facilitating a pressure drop therethrough. Existing particulate removal system 20 may be any of a number of well known systems, such as fabric filters, electrostatic precipitators, and cyclone-type particulate removal devices.

Referring now to FIG. 2, there is shown, agglomerator 100 which is formed in an existing ductwork section, or longitudinally extended housing 140 for flow of flue gas longitudinally therethrough. The flue gas flows in a direction indicated by the directional arrows 50. The flue gas flows through the housing 140 at a fairly high velocity, the importance of which will be described in following paragraphs. Agglomerator 100 includes a plurality of spaced parallel electrodes $102_1$, $102_2$ ... $102_n$ and $104_1$, $104_2$, ... $104_n$. Each of the spaced parallel electrodes, 102, 104 are coupled to opposite ends of a voltage source having a reference output line 114 and a voltage signal line 112. The voltage source may be AC or DC, and provide either a positive or negative voltage to each of the electrodes 102. Further, the power source may provide pulse energization to the electrodes in order to enhance the charging process. Such pulse energization may include the superimposition of extremely fast-rising, short duration, high voltage pulses on an underlying dc level. The pulse rise time may be in the range of 10–50 nanoseconds, with a pulse width which may be approximately 1 microsecond, and a pulse repetition rate on the order of 50–300 pulses per second. Such pulse energization may provide pulse voltage amplitudes in the range of 20–30 kilovolts superimposed on an underlying dc voltage of similar magnitude, in effect doubling the peak kilovolt levels during the pulse. It is well known that application of high voltage pulses increases the uniformity of the corona discharge, and results in very high instantaneous ion densities. Both of those effects are conducive to increasing the effective charging of fine particulates.

Each of the plurality of electrodes 102, 104 are formed by electrically conductive screens, which may be flat metal screens formed by wire elements or expanded metal, positioned transversely with respect to the gas flow through the housing 140. Such screen electrodes are supported within the housing 140, or an existing ductwork by methods well known in the art, such as by means of insulative spacers or the like. The screens have a spacing B which may range from 1–3 inches, with the plurality of screens 102, 104 extending longitudinally a dimension C which may range from 10–20 feet. Each screen 102, 104 is provided with individual screen openings which may range from 0.25 inches to 1.0 inches. The particular screen openings, the spacing B between electrodes, and the number of parallel electrode pairs 102, 104, thereby establishing the dimension C, is selected so as to maximize the temporary capture and agglomeration of the fine particulates, while minimizing the introduction of large pressure drops in the gas flow therethrough. Thus, an agglomerator 100 may have as few as two screen electrodes 102, 104 to well over one hundred.

By virtue of the screen elements, the small conducting surfaces which bound the grid spacing, the electric field lines are concentrated and provide greater electrical forces than are seen in a normal precipitator, where the electric field is spread out over a broad collecting surface. To further concentrate the fields and promote corona discharge, the plates $102_1$–$102_n$ are provided with a plurality of pointed electrode elements 108 disposed in spaced relationship across the surface of the screen electrodes $102_1$–$102_n$. These pointed electrode elements 108 are electrically coupled to the screen electrodes 102 and extend longitudinally from the surface thereof in a direction which is toward the gas stream flow, extending in the same direction as is indicated by the directional arrows 50. By spacing these pointed electrode elements 108 across the entire surface of each screen electrode 102, a more uniform corona discharge is established, for further maximizing the efficiency of the system.

In operation, the gas stream carrying particulates having a size which ranges from 0.1 to 2.0 microns flows longitudinally through the ductwork 140, as indicated by the directional arrows 50. As the particulates pass through the electrode screen $102_1$ and pass the pointed electrode elements 108 they become charges, either positively or negatively, depending upon the voltage supplied on line 112. The charged particulates begin to collect on the screen electrode $104_1$, and where one particulate 30 contacts another, the particles adhere to one another. As a result of the high gas flow rate within the ductwork 140, on the order of fifty feet per second, the agglomerates formed on the electrode screen $104_1$ will be reentrained into the gas stream to then pass to another of the charging electrodes $102_2$, passing through that screen and through the corona discharge which is promoted by the pointed electrode elements 108. Further agglomeration occurs on the collecting electrode $104_2$, the agglomerates formed thereon being reentrained back into the gas stream. This process continues until the last pair of electrode screens $102_n$, $104_n$, the large agglomerates 40 formed thereon being reentrained to continue flowing with the gas stream indicated by the directional arrows 52.

As the agglomerates and individual particulates are reentrained from any of the collection screen electrodes 104, some of the particles may take on an opposite charge as they pass from the grounded screen due to induction. Such oppositely charged particulates will be collected and agglomerate on the electrodes 102, and be reentrained therefrom, or may be attracted to other oppositely charged particulates in the gas stream, agglomerating while being carried by the gas. Use of an alternating current voltage will further promote reentrainment, the holding force rising and falling with the changes in voltage and changes in polarity.

As it is important to establish a substantially uniform corona discharge across the electrodes 102, a plurality of pointed electrode elements 108 are disposed in vertically and horizontally spaced relationship one with respect to another. Each of the pointed electrodes 108 is spaced one from another by a distance A on each of the electrodes 102. The spacing distance A is a predetermined distance which is proportional to a distance B between a respective pair of screen electrodes 102 and 104. In one particular embodiment, the spacing distances A and B were made equal to provide a highly efficient agglomerator. The number of sets of parallel electrodes, their spacing B, the distance C through which the gas stream is exposed to the agglomerating process, and the flow rate of the gas stream are variables which are important in establishing the effectiveness of agglomerator 100. It has been found that those variables should be adjusted such that the gas resonance time is within the range of 0.5 to 1.0 seconds, such providing sufficient residence time to effectively agglomerate the particulates, without causing a substantial pressure drop across agglomerator 100.

Referring to FIG. 3, there is shown an agglomerator 100' having a slightly different configuration from that of agglomerator 100. Agglomerator 100' is provided with at least two screen electrodes 102, 104, wherein the screen electrode 102 is coupled to the power supply output line 112, while the screen electrode 104 is coupled to the power supply output line 114. Power supply 110 may supply dc voltage, ac voltage, or a pulsating voltage output on the output lines 112, 114. In particular, the output voltage supplied on line 114 to the screen electrode 104 is referenced to a ground potential 115. The screen electrodes 102, 104 are disposed within an existing ductwork 140 or a longitudinally extended housing adapted for flow of a gas stream therethrough. The particulate-laden gas stream flows through the ductwork 140, as indicated by the directional arrows 50 with the particulates 30 passing through the screen electrode 102 and the corona discharge established by the plurality of spaced pointed electrodes 108 electrically coupled thereto. As previously discussed, the spacing between the respective pointed electrodes 108 is a predetermined distance which is proportional to the distance between the electrodes 102 and 104.

The particulates 30 which are charged as they pass through the screen electrode 102, are collected on the screen electrode 104, agglomerate, with the agglomerates 40 being reentrained into the gas stream, and flow in the direction indicated by directional arrows 52 to be separated from the gas by an electrostatic precipitator, fabric filter, or cyclone-type particulate removal system. In addition to providing a concentration of electric field lines due to the screen geometry, both screens 102 and 104 may be made capable of generating a corona, each having respective pointed electrodes 108, 118. Thus, the screen electrode 104 would be provided with a plurality of spaced pointed electrodes 118 electrically coupled thereto. The spacing distance between each of the pointed electrodes 118 would again be established in proportion to the spacing between the electrodes 104 and 102. By this arrangement, both screens are capable of generating corona, with an appropriately applied voltage, and would produce both positive and negative ions for bi-polar charging of the particulates. In this manner, agglomeration will be facilitated to occur within the bulk gas stream as these oppositely charged particles are reentrained therein and are attracted to one another. Thus, the efficiency of the system is the product of both the agglomeration which takes place on the screen electrodes, as well as that which results from inter-particle contact subsequent to passage through the screens, between sets of screens and downstream of the last screen.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A system for removing fine particulates from a gas stream, comprising:

a longitudinally extended housing having a gas inlet disposed at one longitudinal end coupled to a gas source for flow of a particle laden gas stream therein, said housing having a gas outlet disposed at an opposing longitudinal end thereof;

a first screen electrode disposed transversely within said housing, said first screen electrode having a predetermined grid spacing;

a second screen electrode disposed transversely within said housing and longitudinally spaced from said first screen electrode by a predetermined distance for forming agglomerates thereon and reentraining the agglomerates into said gas stream flow, said second screen electrode having a predetermined grid spacing;

a power supply having a first voltage output line coupled to said first screen electrode and a second voltage output line coupled to said second screen electrode;

a plurality of pointed electrode elements electrically coupled to said first screen electrode and extending longitudinally from said first screen electrode toward said gas outlet, said plurality of pointed electrode elements being spaced on said first screen electrode by a distance proportional to said predetermined distance between said first screen electrode and said second screen electrode; and, agglomerate removal means coupled in fluid communication to said gas outlet.

2. The system as recited in claim 1 where said agglomerate removal means includes an electrostatic precipitator having an inlet coupled in fluid communication to said gas outlet.

3. The system as recited in claim 1 where said agglomerate removal means includes a filter having a fabric medium, said filter having an inlet coupled in fluid communication to said gas outlet.

4. The system as recited in claim 1 where said power supply first voltage output line supplies a dc voltage to said first screen electrode that is negative with respect to a voltage supplied to said second screen electrode.

5. The system as recited in claim 4 where said dc voltage is pulsed.

6. The system as recited in claim 4 where said dc voltage includes a dc pulse component superimposed on a dc base voltage.

7. The system as recited in claim 1 where said power supply first voltage output line supplies a dc voltage to said first screen electrode that is positive with respect to a voltage supplied to said second screen electrode.

8. The system as recited in claim 7 where said dc voltage is pulsed.

9. The system as recited in claim 7 where said dc voltage includes a dc pulse component superimposed on a dc base voltage.

10. The system as recited in claim 1 where said power supply first voltage output line supplies an ac voltage to said first screen electrode.

11. The system as recited in claim 1 where said predetermined grid spacing of said first and second screen electrodes is in an approximating range of 0.25 to 1.0 inches.

12. The system as recited in claim 1 further comprising a second plurality of pointed electrode elements electrically coupled to said second screen electrode and extending longitudinally from said second screen electrode toward said gas outlet, said second plurality of pointed electrode elements being spaced on said second screen electrode by a distance proportional to said predetermined distance between said first screen electrode and said second screen electrode.

13. The system as recited in claim 1 further comprising:
a plurality of third screen electrodes electrically coupled one to another and to said first screen electrode, said plurality of third screen electrodes being disposed in longitudinally spaced parallel relation; and,
a plurality of fourth screen electrodes electrically coupled one to another and to said second screen electrode, said plurality of fourth screen electrodes being interposed between respective pairs of said plurality of third electrodes and spaced said predetermined distance therefrom, each of said plurality of third electrodes having a respective plurality of said pointed electrode elements electrically coupled thereto and extending longitudinally therefrom, said pointed electrode elements on each of said third screen electrodes being spaced by a distance proportional to said predetermined distance between a respective one of said plurality of third screen electrodes and a respective adjacent one of said plurality of fourth screen electrodes.

14. The system as recited in claim 13 where said housing is dimensioned to establish a predetermined velocity of said particular laden gas and said first, second, third and fourth screen electrodes together occupy a predetermined longitudinal distance within said housing, said predetermined velocity of said particulate laden gas and said predetermined longitudinal distance establishing a gas residence time within the approximating range of 0.5 to 1.0 seconds.

15. The system as recited in claim 14 where each of said first, second, third and fourth screen electrodes have a grid spacing in an approximating range of 0.25 to 1.0 inches.

16. A particulate agglomerator coupled between a source of particulates and a particulate removal system for improving the sub-micron particulate removal effectiveness thereof, comprising:

a high voltage power supply having a pair of output terminals;

a longitudinally extended ductwork having an inlet for receiving a particulate laden gas and a longitudinally displaced gas outlet coupled in fluid communication with the particulate removal system, said ductwork being dimensioned to establish a predetermined velocity of said particulate laden gas;

first screen means disposed transversely within said ductwork and having a predetermined grid spacing for electrostatically charging particulates passing through said spacing, said first screen means being electrically coupled to a first of said pair of power supply output terminals;

second screen means disposed transversely within said ductwork and in longitudinally spaces relation with said first screen means for electrostatically attracting said charged particulates and forming agglomerates thereof, said second screen means being electrically coupled to a second of said pair of power supply output terminals and having a predetermined grid spacing to reentrain the agglomerates into gas flowing to said ductwork outlet for subsequent removal by the particulate removal system, said first and second screen means defining a predetermined number of screen electrodes occupying a predetermined longitudinal distance within said ductwork, said predetermined velocity of said particulate laden gas and said predetermined longitudinal distance establishing a gas residence time within the approximating range of 0.5 to 1.0 seconds for said predetermined number of screen electrodes; and, a plurality of pointed electrode elements electrically coupled to said first screen means and disposed in spaced relation one to an other, each of said plurality of pointed electrode element extending in a direction of a flow the gas.

17. The system as recited in claim 16 where said plurality of pointed electrode elements are spaced one from another by a distance proportional to a distance between said predetermined number of screen electrodes of said first screen means and said second screen means.

18. The system as recited in claim 16 where said predetermined grid spacing of said first and second screen means is in an approximating range of 0.25 to 1.0 inches.

* * * * *